United States Patent [19]

Moriyama

[11] Patent Number: 5,822,627
[45] Date of Patent: Oct. 13, 1998

[54] FOCUS STATE DETECTION DEVICE

[75] Inventor: Keiji Moriyama, Kanagawa-ken, Japan

[73] Assignee: Nikon Corporation, Tokyo, Japan

[21] Appl. No.: 848,029

[22] Filed: Apr. 28, 1997

Related U.S. Application Data

[63] Continuation of Ser. No. 489,632, Jun. 12, 1995, abandoned.

[30] Foreign Application Priority Data

Jun. 13, 1994 [JP] Japan .................. 6-130496

[51] Int. Cl.$^6$ ...................................... G03B 13/36
[52] U.S. Cl. ..................... 396/121; 396/114; 396/119; 396/268
[58] Field of Search ................... 396/111, 112, 396/119, 120, 121, 124, 268, 274

[56] References Cited

U.S. PATENT DOCUMENTS

| | | | |
|---|---|---|---|
| 4,857,718 | 8/1989 | Karasaki et al. | 250/201 |
| 4,903,066 | 2/1990 | Moriyama et al. | 354/406 |
| 5,233,173 | 8/1993 | Moriyama | 250/201.8 |
| 5,257,062 | 10/1993 | Moriyama . | |
| 5,262,819 | 11/1993 | Ohtaka et al. | 354/402 |

FOREIGN PATENT DOCUMENTS 63-278012  11/1988  Japan .
3-249718  11/1991  Japan .

*Primary Examiner*—Safet Metjahic
*Assistant Examiner*—Michael Dalakis
*Attorney, Agent, or Firm*—Oliff & Berridge, PLC

[57] ABSTRACT

A compact focus state detection device having a plurality of focus state detection areas at the center of and away from the center of the photo field. A first focus state detection optical system has focus state detection areas away from the center of the photo field and in a direction substantially perpendicular to the radial direction from the center point. The optical axis of each re-imaging lens of the first focus state detection optical system is decentered toward the optical axis of the shooting lens from the center of each corresponding aperture stop. Therefore, when focus state detection light rays pass through the re-imaging lens, the exit direction of the light rays deflects toward the optical axis of the shooting lens.

30 Claims, 13 Drawing Sheets

FOCUS STATE DETECTION DEVICE

This is a continuation of application Ser. No. 08/489,632 filed Jun. 12, 1995 now abandoned.

BACKGROUND OF THE INVENTION

1. Field of the Invention

The present invention relates to a focus state detection device for use in a camera or the like.

2. Description of Related Art

FIG. 12 shows the basic configuration of a focus state detection device for use in a camera including a focus state detection optical system using a TTL phase difference detection method. The focus state detection optical system includes a shooting lens 1 having an exit pupil 10, a field mask 20, a condenser lens 30, a diaphragm mask 40, a re-imaging lens 50 and a photoelectric conversion device 60. All of these components are positioned on the optical axis O of shooting lens 1.

Exit pupil 10 is divided into two regions 101 and 102. Shooting lens 1 composes light rays passing through the two regions 101 and 102 into a primary image of the subject at the predicted focussing plane 2. The predicted focusing plane is a plane located at substantially the same distance as the film plane near field mask 20. Extraction of the light rays is performed by field mask 20, so that light rays incident on condenser lens 30 are restricted to the subject. Light rays passing through condenser lens 30 also pass through diaphragm mask 40, which also restricts unnecessary light rays. Light rays passing through the diaphragm mask are re-composed by re-imaging lens 50 to form secondary images of the subject on photoelectric conversion device array 60.

In a conventional focus state detection device, a re-imaging system behind the shooting lens 1 primary image detects the focus adjustment condition of shooting lens 1. The re-imaging system includes condenser lens 30, diaphragm mask 40 having a pair of apertures 401 and 402, and re-imaging lens 50 having a pair of lens components 501 and 502. Thus, a pair of secondary images substantially similar to the primary image forms on photoelectric conversion device arrays 601 and 602 of photoelectric conversion device 60. The relative position relationship of the secondary image pair changes according to the focus adjustment condition of shooting lens 1.

FIG. 2 shows an example layout of a focus state detection device inside a camera body. A portion of light rays from the subject exiting shooting lens 1 pass through a main mirror 7. The rest of the light rays are reflected. Light rays passing through main mirror 7 reflect off an auxiliary mirror 9 toward the camera body bottom and form a primary image on predicted focussing plane 2. Light rays from the primary image are incident on a focus state detection device 11 positioned below the primary image. To arrange a focus state detection device 11 within the limited space inside a camera body, the optical path is bent by inserting a reflecting member, a mirror or the like, into the optical path of the focus state detection optical system.

Light rays reflected by main mirror 7 compose on a focussing plate 8a located at a plane substantially equivalent to the film plane. The subject's primary image on focussing plate 8a is observed through a viewfinder optical system including an eyepiece lens 8c and an erecting system such as a pentagonal roof prism 8b or the like. Furthermore, if the position corresponding to the focus state detection area on focussing plate 8a is displayed by means of a display device such as a LCD (not shown) or the like, the photographer may observe the subject in the photo field while simultaneously observing the focus state detection areas.

A focus state detection device may have two focus state detection optical systems and two corresponding focus state detection areas. One region positioned at the center of the photo field (the position of the optical axis of the shooting lens) and one region positioned away from the center of the photo field. The photo field is established at the predicted focussing plane of the shooting lens.

In a conventional focus state detection device of this type, the pairs of photoelectric device arrays corresponding to the focus state detection areas of each focus state detection optical system are formed on the same substrate. Therefore, the substrate is large. Thus, a large space is required inside the camera body for the substrate.

To resolve this problem, Laid-Open Japanese Patent Application 63-278012 shows a focus state detection device where a light deflecting device is placed immediately in front of or immediately behind the condenser lens. The light rays used in focus state detection are deflected from the focus state detection areas away from the center of the photo field toward the optical axis by the shape of the condenser lens and the eccentricity of the optical axis. Thus, the substrate in the photoelectric conversion device can be made smaller.

However, when a light deflecting device is placed immediately in front of or immediately behind the condenser lens, the focus state detection device becomes larger. As a result, the focus state detection device is difficult to place in the limited space inside the camera body.

Further, when light rays used in focus state detection are deflected toward the optical axis of the shooting lens through the shape of the condenser lens itself or the eccentricity of the optical axis, the distance between apertures in each pair of aperture stops in each focus state detection optical systems becomes shorter. Consequently, the problem of stray light arises. That is, light rays incident from the field mask aperture of an adjacent focus state detection optical system enter the aperture stop and reach the photoelectric conversion device. This problem is indicated by light ray P1 in FIG. 13.

In FIG. 13, light ray P1 passes through aperture 221 of field mask 22 corresponding to a focus state detection area positioned away from the center of the photo field. The light ray passes through aperture 421 of diaphragm mask 42 and lens component 521 of re-imaging lens 52 to reach array 621 of a substrate 62 of a photoelectric conversion device (not shown) corresponding to a different focus state detection area at the center of the photo field. A focus state detection optical system having focus state detection areas at the center of and away from the center of the photo field, respectively, makes the distance short between apertures 421 and 422. The angle between light ray P1 prior to condenser lens 32 and the focus state detection light rays corresponding to a focus state detection area away from the center of the photo field is small. Therefore, stray light is produced.

A light-blocking mask on the optical path of the focus state detection optical system has been proposed to prevent stray light. However, reflecting members that bend the optical path of the focus state detection optical system restrict the space inside the camera body. The reflecting members are necessary to make the focus state detection device smaller. Consequently, it is impossible to completely block all stray light.

A conventional focus state detection optical system may have focus state detection areas away from the center of the photo field. Causing the reverse projected image of the aperture stop via the condenser lens to be decentered toward the shooting lens optical axis can be considered to prevent vignetting. Vignetting is the partial loss of the light rays used in focus state detection because of the aperture efficiency of the shooting lens actually mounted. The shooting lens actually mounted causes a reverse image at the aperture stop near the exit pupil. The optical path of focus state detection light rays pass through the condenser lens from the reverse projected image and reach the aperture stop. These focus state detection light rays gradually becomes farther away from the optical axis of the shooting lens. Consequently, these focus state detection light rays pass through a re-imaging lens at a position farther from the optical axis and cause an image to be composed at a position farthest from the optical axis. Accordingly, the substrate containing the arranged arrays of photoelectric conversion devices to detect these images becomes extremely large.

Further, an above-described focus state detection device may have focus state detection optical systems where the optical path of focus state detection light rays gradually becomes farther from the shooting lens optical axis. However, the optical axis of each re-imaging lens and the center of each corresponding aperture stop are located at substantially the same distance from the optical axis O of the shooting lens. As shown in FIG. 14, the optical axis of a re-imaging lens is positioned such that the principal planes Hc and Hd have a positional relationship causing the direction of the incident light rays and exiting light rays to coincide. In FIG. 14, diaphragm mask 44 includes apertures 441–442 and 445–448, reimaging lens 54 includes lens components 541–542 and 545–548, and substrate 64 includes arrays 64–642 and 645–648.

SUMMARY OF THE INVENTION

It is an object to provide a more compact focus state detection device having a plurality of focus state detection areas at the center of and away from the center of the photo field.

This and other objects of the invention are achieved by providing a focus state detection device including a plurality of sets of focus state detection optical systems. Each set of focus state detection optical system includes a pair of aperture stops, a pair of re-imaging lenses, and condenser lenses positioned near the predicted focussing plane of the shooting lens. Having exited the shooting lens and passed through the condenser lens, a pair of aperture stops establish the regions through which a pair of light rays used in focus state detection pass. The pair of re-imaging lenses correspond to the pair of aperture stops. A first of the plurality of sets of focus state detection optical systems has focus state detection areas positioned away from the center of the photo field established at the predicted focussing plane. The focus state detection areas lie in a direction substantially perpendicular to the radial direction from the center of the photo field. The shooting lens focus adjustment state is detected based on the relationship between the relative positions of the plurality of pairs of secondary images of the subject formed by the plurality of sets of focus state detection optical systems. The optical axis of each re-imaging lens in the first focus state detection optical system is decentered toward the optical axis of the shooting lens from the center of the corresponding aperture stops. In this manner, the object of a more compact focus state detection device having a plurality of focus state detection areas at the center and away from the center of the photo field is achieved.

In accordance with another aspect of the invention, a focus state detection device includes a plurality of sets of focus state detection optical systems. Each set of focus state detection optical systems includes a pair of aperture stops, a pair of re-imaging lenses, and condenser lenses positioned near the predicted focussing plane of the shooting lens. Having exited the shooting lens and passed through a condenser lens, a pair of aperture stops establish the regions through which a pair of focus state detection light rays pass. The pair of re-imaging lenses correspond to the pair of aperture stops. A first of the plurality of sets of focus detection optical systems has focus state detection areas positioned away from the center of the photo field. The focus state detection areas lie in a direction substantially perpendicular to the radial direction from the center of the photo field. The pass-though aperture stop regions for the pair of focus state detection light rays are decentered toward the optical axis of the shooting lens. Therefore, the focus state detection light rays from the condenser lens and incident on each aperture stop must travel at an angle and become slightly farther away from the optical axis of the shooting lens. The optical axis of each re-imaging lens in the first focus state detection optical system and the center of the corresponding aperture stops are a substantially equal distance from the optical axis of the shooting lens. The shooting lens focus adjustment state is detected based on the relationship between the relative positions of the plurality of pairs of secondary images of the subject formed by the plurality of sets of focus state detection optical systems.

The second of the plurality of sets of focus state detection optical systems of the focus state detection device may have in the center of the photo field a focus state detection area A1L in a direction substantially perpendicular to the focus state detection areas A1M and A1N of the first focus state detection optical systems (see FIG. 4). Also, the second of the plurality of sets of focus state detection optical systems may have in the center of the photo field a focus state detection area A1L in a direction substantially perpendicular to, and a focus state detection area A1L substantially parallel to, the focus state detection areas A1M and A1N.

The optical axis of each re-imaging lens in the first focus state detection optical system having focus state detection areas A1M or A1N may be decentered or displaced toward the optical axis of the shooting lens from the center of each corresponding aperture stop. Accordingly, focus state detection light rays passing through the re-imaging lens are deflected and exit in a direction toward the shooting lens optical axis.

In the present invention, the substrate containing the arrays of photoelectric conversion devices is more compact because light rays used in focus state detection exit toward the optical axis from each re-imaging lens. Thus, the image position on the substrate moves toward the optical axis. The effect is caused by the optical axis of each re-imaging lens being decentered toward the shooting lens optical axis relative to the center of each corresponding aperture stop.

The re-imaging lens optical axis and the corresponding aperture stop center may be placed substantially equidistant from shooting lens optical axis O. Thus, the second embodiment achieves the equivalent effect as decentering the re-imaging lens optical axis toward the shooting lens optical axis in real terms. The result is because of the relationship between the incident light rays and the principal plane Ha on the side of incidence, as shown in FIG. 9. Also, a principal plane Hb is on the side of the exiting light rays.

Further, because a light deflector is not positioned immediately in front of or immediately behind the condenser lens, the focus state detection device as a whole is made smaller. Then, it is easier to position the focus state detection device within the limited space inside a camera body.

Furthermore, deflecting of focus state detection light rays toward the optical axis of the shooting lens is not caused by the shape of the condenser lens itself or the eccentricity of the optical axis. Therefore, even in a focus state detection optical system having adjacent focus state detection areas at the center of and away from the center of the photo field, the distance between aperture stops in each pair of adjacent aperture stops does not become shorter. Accordingly, as shown in FIG. 8, the angle of incidence must be very large for a light ray from the aperture of the field mask of one focus state detection optical system to enter the aperture stop of an adjacent focus state detection optical system to reach the array of photoelectric conversion devices. The light ray having such a large angle of incidence is incident outside the reflecting surface of auxiliary mirror 9. Auxiliary mirror 9 guides light rays used in focus state detection toward the bottom of the camera body. Consequently, light ray P2 is not reflected toward the focus state detection device, and stray light such as light ray P2 is controlled.

Other objects, advantages and salient features of the invention will become apparent from the detailed description taken in conjunction with the annexed drawings, which disclose preferred embodiments of the invention.

BRIEF DESCRIPTION OF DRAWINGS

The invention will be described with reference to the following drawings in which like reference numerals refer to like elements and wherein.

DETAILED DESCRIPTION OF PREFERRED EMBODIMENTS

Figure 1:
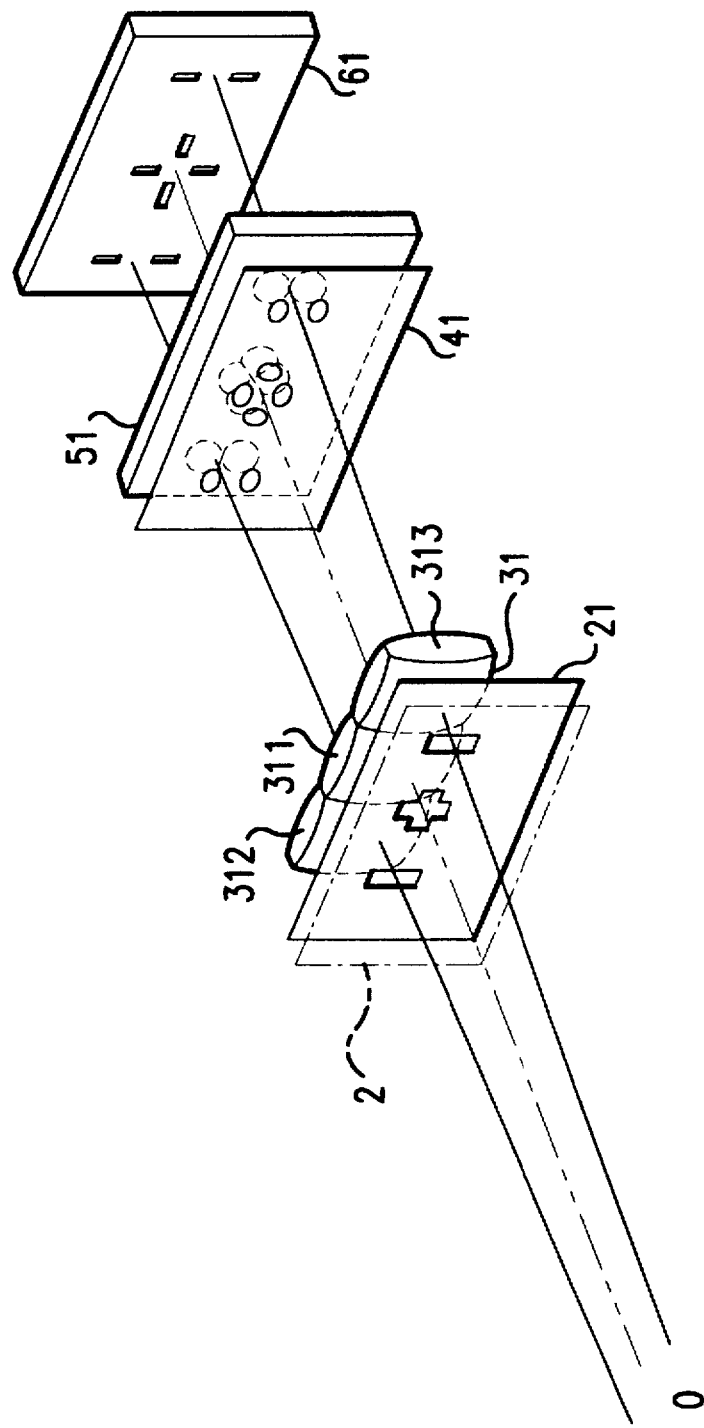
FIG. 1 is a perspective drawing showing a focus state detection optical system according to an embodiment of the present invention.

A first embodiment of a focus state detection optical device will be described with reference to FIGS. 1–7. FIG. 1 shows a perspective view of the focus state detection optical system according to the first embodiment. Behind a predicted focussing plane 2 along optical axis O are arranged, a field mask 21, a condenser lens 31, a diaphragm mask 41, a bi-convex re-imaging lens 51 and a photoelectric conversion device 61.

Figure 2:
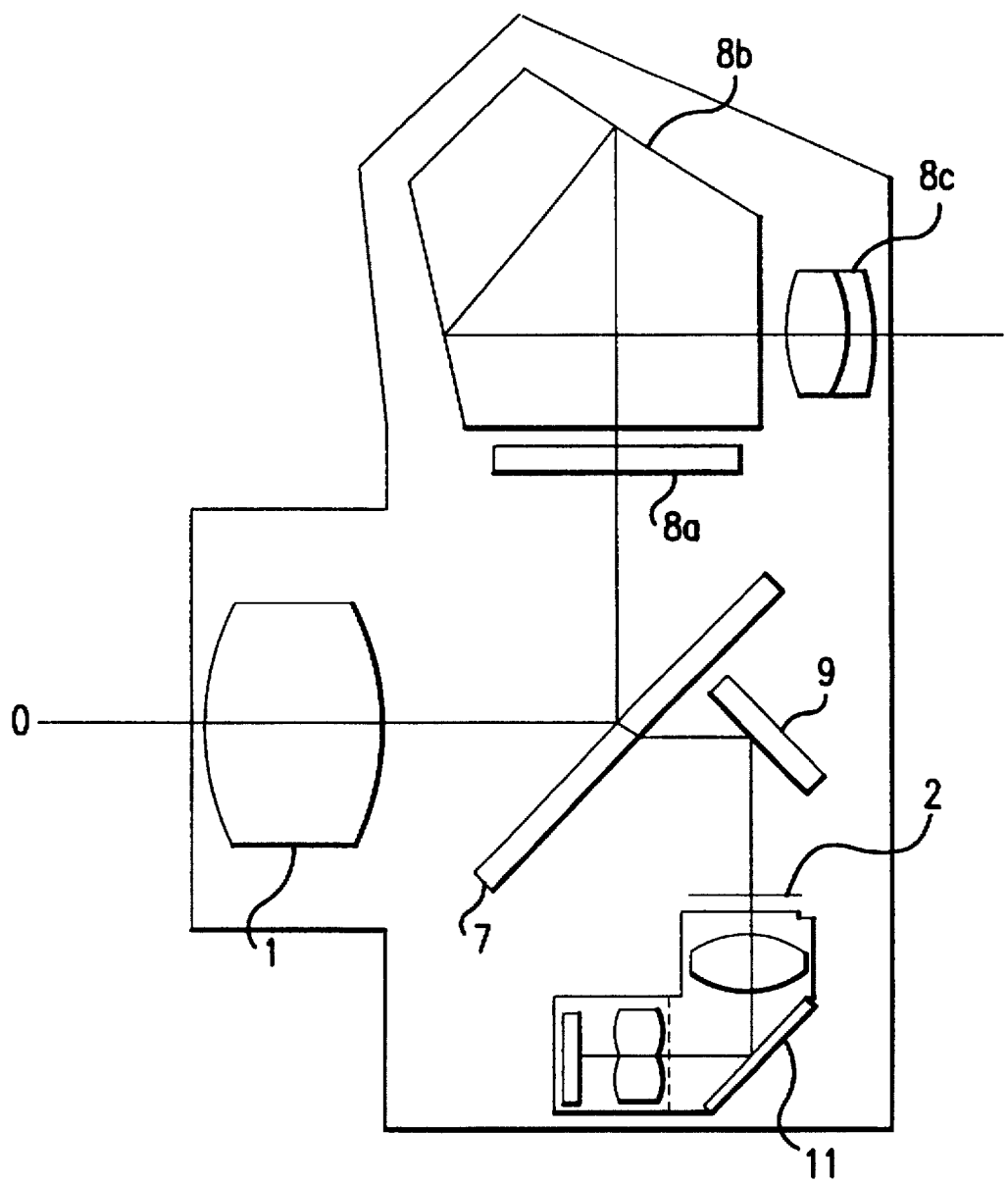
FIG. 2 is a cross-sectional drawing of a camera body housing a focus state detection system according to an embodiment of the present invention.
Figure 3:
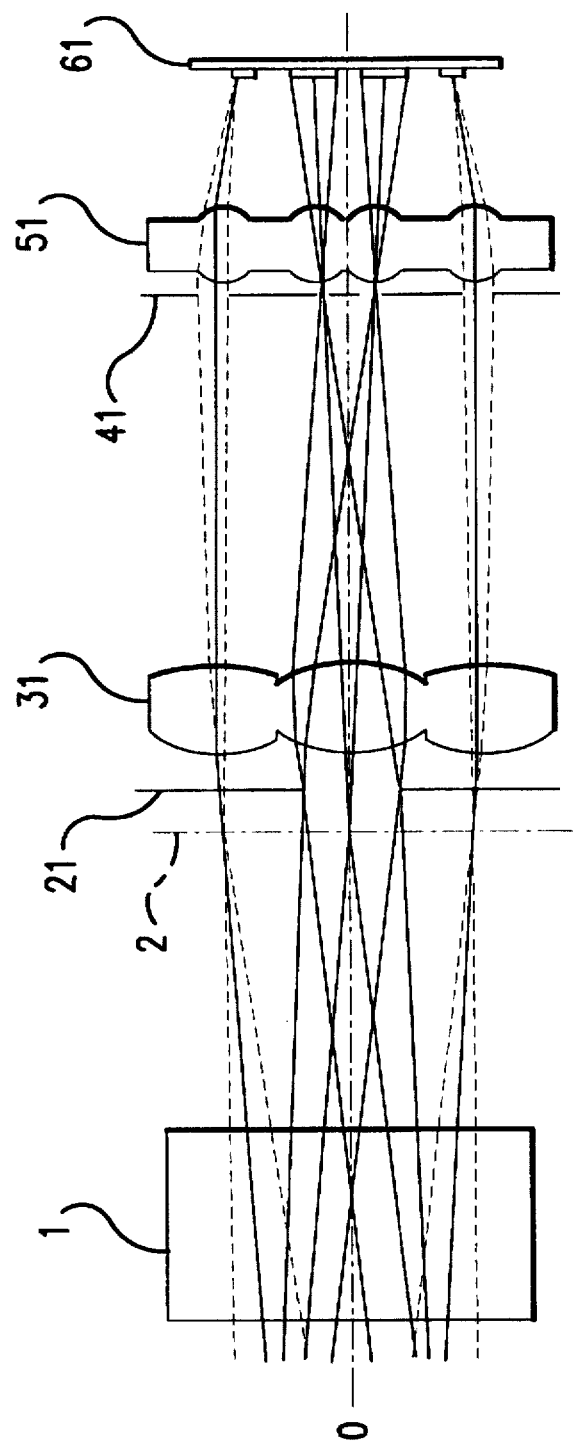
FIG. 3 is a diagram of a focus state detection optical system according to an embodiment of the present invention.
Figure 4:
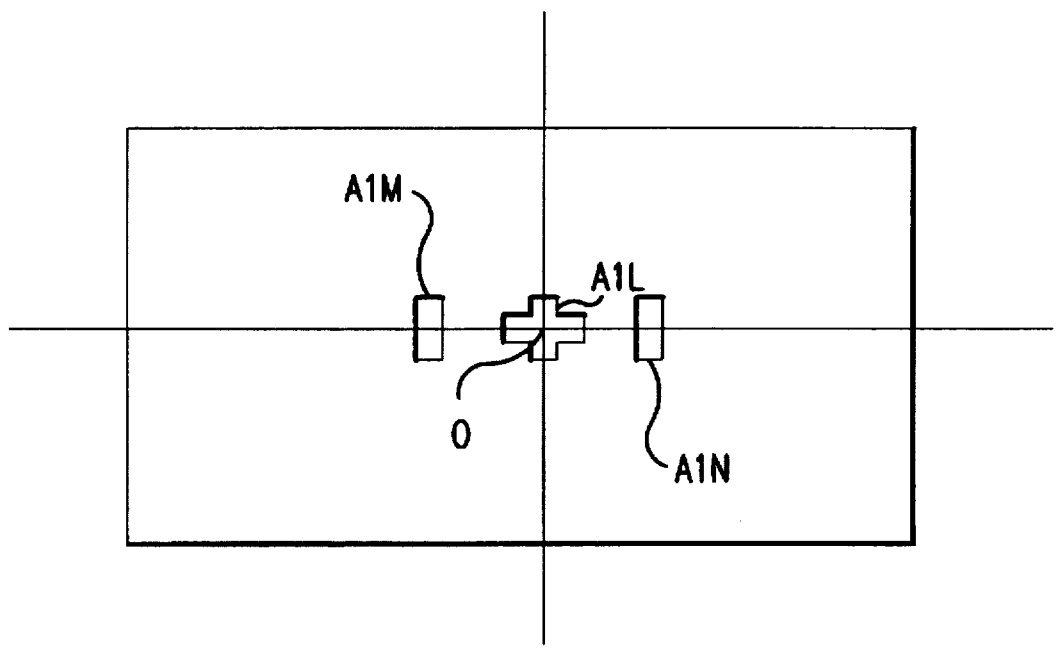
FIG. 4 is a drawing showing focus state detection areas on the photo field according to an embodiment of the present invention, as viewed through the viewfinder optical system.

FIG. 2 shows a cross-sectional view of a camera body housing a focus state detection device according to the first embodiment. FIG. 3 shows a schematic diagram of a focus state detection optical system according to the first embodiment. FIG. 4 shows the arrangement of focus state detection areas on the photo field as viewed through the viewfinder optical system. On the center of the photo field is a cross-shaped focus state detection optical region A1L positioned on optical axis O. Focus state detection areas A1M and A1N are positioned away from the center of the photo field and symmetric about the center to the left and right, respectively. The focus state detection areas A1M and A1N are positioned in a direction substantially perpendicular to the radial direction from the center of the photo field. Focus state detection area A1L has both a region substantially parallel to and a region substantially perpendicular to focus state detection areas A1M and A1N.

Figure 5:
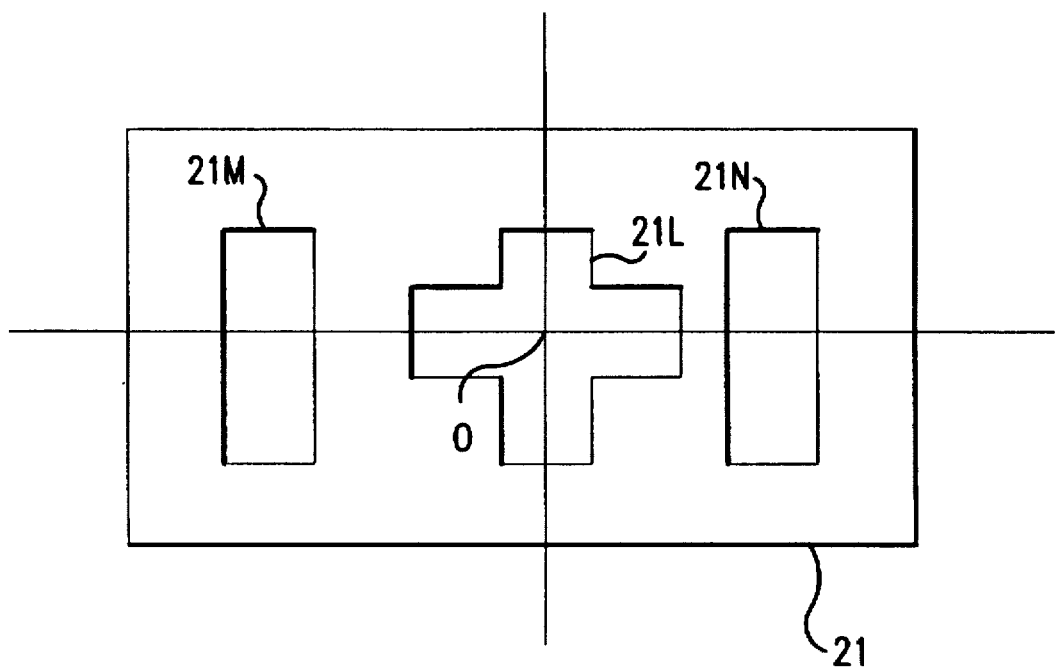
FIG. 5 is a drawing showing a field mask and apertures according to an embodiment of the present invention.

FIG. 5 shows field mask 21 and apertures 21L, 21M and 21N. Field mask aperture 21L corresponds to focus state detection area A1L at the center of the photo field, and field mask apertures 21M and 21N correspond to focus state detection areas A1M and A1N away from the center of the photo field. Condenser lens 31 is positioned behind the field mask. As shown in FIG. 1 condenser lens 31 has three lens components 311, 312 and 313 corresponding to focus state detection areas A1L, A1M and A1N, respectively.

Figure 6:
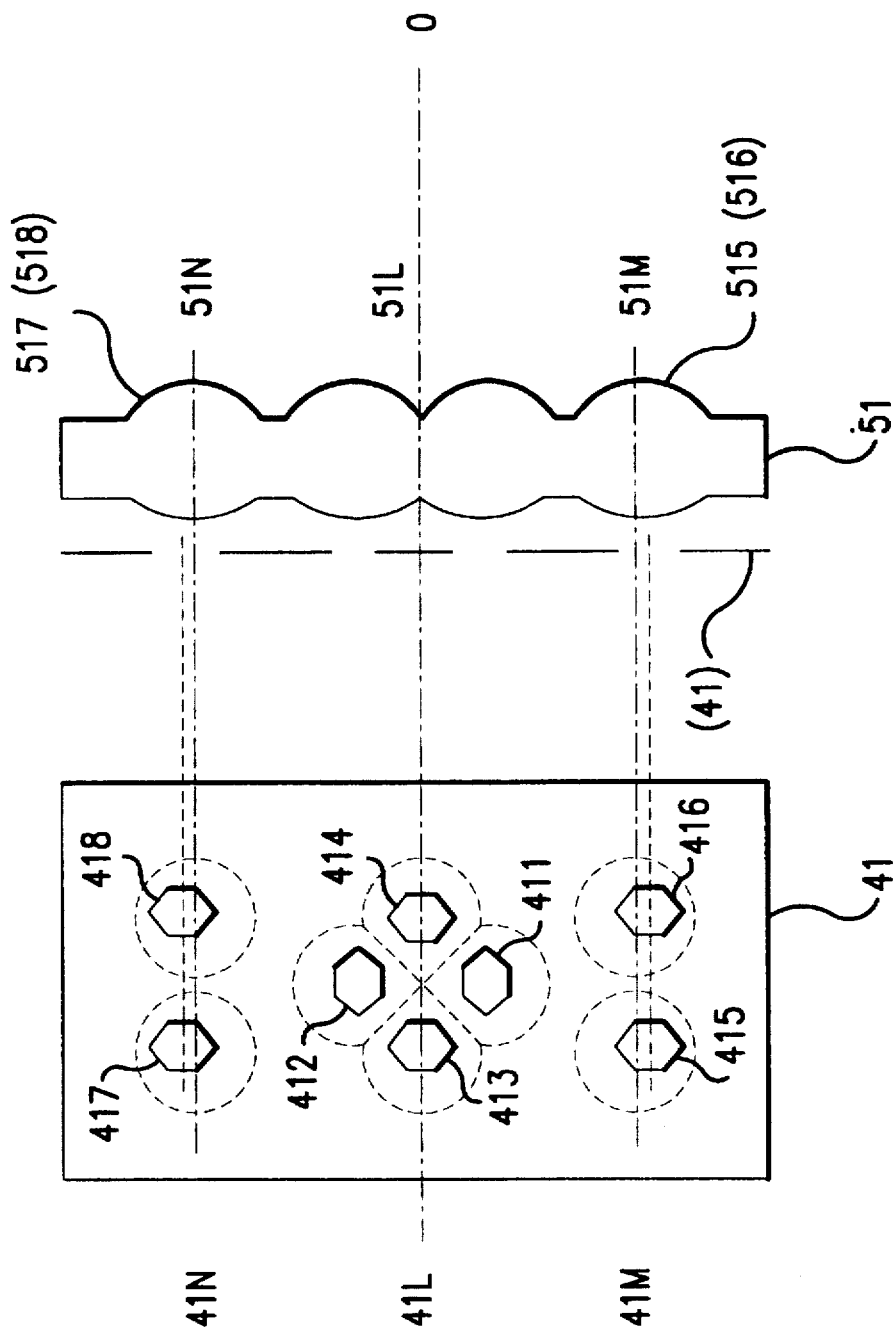
FIG. 6 is a drawing showing the positional relationship between the diaphragm mask apertures and the lens components of the re-imaging lens according to an embodiment of the present invention.

FIG. 6 shows the relationship between the positions of the apertures of diaphragm mask 41 and the lens components of re-imaging lens 51. Lens components 515 and 516 of re-imaging lens 51M correspond to focus state detection area A1M. The optical axis of each lens component 515 and 516 is off-center and positioned toward optical axis O relative to the center of each aperture 415 and 416 of corresponding diaphragm 41M. Similarly, the optical axis of each lens component 517 and 518 of re-imaging lens 51N corresponding to focus state detection area A1N is off-center and positioned toward optical axis O relative to the center of each aperture 417 and 418 of corresponding diaphragm 41N.

Figure 7:
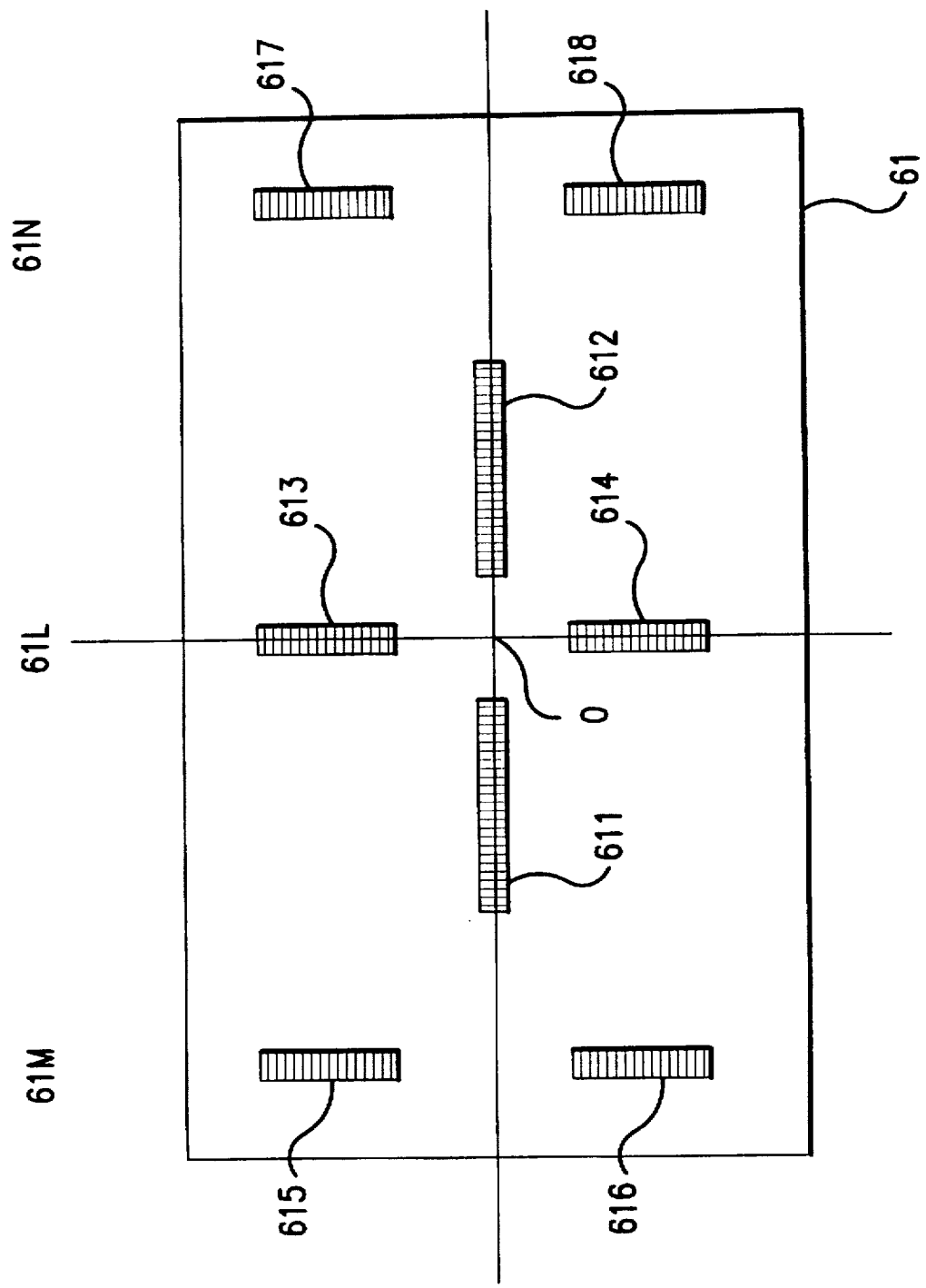
FIG. 7 is a drawing showing a substrate of photoelectric conversion devices according to an embodiment of the present invention.

FIG. 7 shows the substrate 61 of the photoelectric conversion device (not shown). As noted above, the optical axis of each lens component of re-imaging lens 51 corresponding to focus state detection areas A1M and A1N is decentered or displaced toward optical axis O of the photo field from the center of each corresponding aperture of the diaphragm 41. Light rays used in focus state detection from focus state detection areas A1M and A1N, away from the center of the photo field, exit from re-imaging lens 51 on the side toward optical axis O. Accordingly, each pair of device arrays 615, 616 and 617 and 618 of photoelectric conversion devices 61M and 61N corresponding to focus state detection areas A1M and A1N can be positioned next to each pair of device arrays 611, 612 and 613 and 614 of photoelectric conversion device 61L corresponding to apertures 411–414 of diaphragm 41L, re-imaging lens 51L and the focus state detection area A1L. Therefore, the surface area of substrate 61 is reduced.

Figure 8:
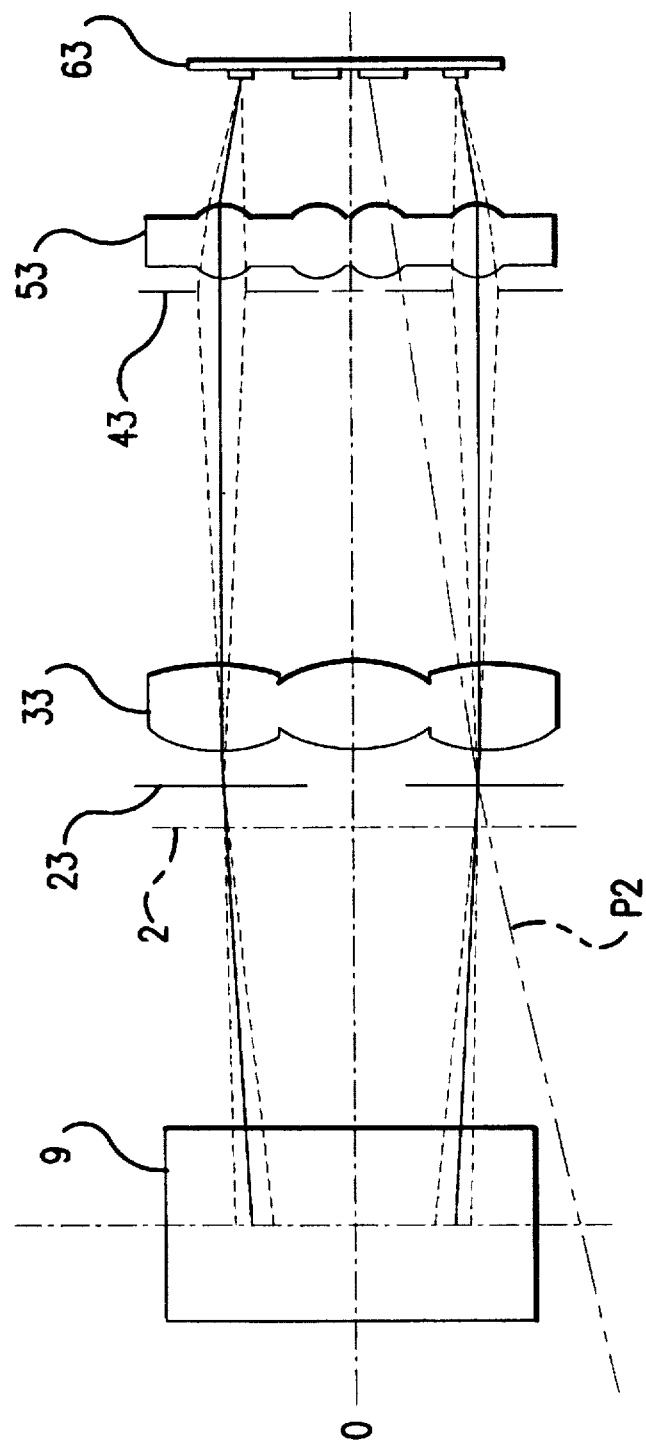
FIG. 8 is a schematic diagram of a focus state detection optical system according to another embodiment of the present invention.

A second embodiment of a focus state detection optical device will be described with reference to FIGS. 8 and 9. FIG. 8 is a schematic drawing of the focus state detection optical system of the second embodiment according to the present invention. To prevent vignetting caused by the aperture efficiency of the shooting lens actually mounted, the configuration is such that the reverse projected images of apertures 435 to 438 of diaphragm 43 having passed through condenser lens 33 face optical axis O of shooting lens 1. Light rays reaching apertures 435 to 438 of diaphragm 43 through condenser lens 33 travel in a direction that makes the light rays gradually separate farther from optical axis O of shooting lens 1. Light rays used in focus state detection from the reverse projected images of apertures 435 to 438 correspond to focus state detection areas away from the center of the photo field. A field mask 23 and a substrate 63 of the photoelectric conversion device (not shown) are shown in FIG. 8.

Figure 9:
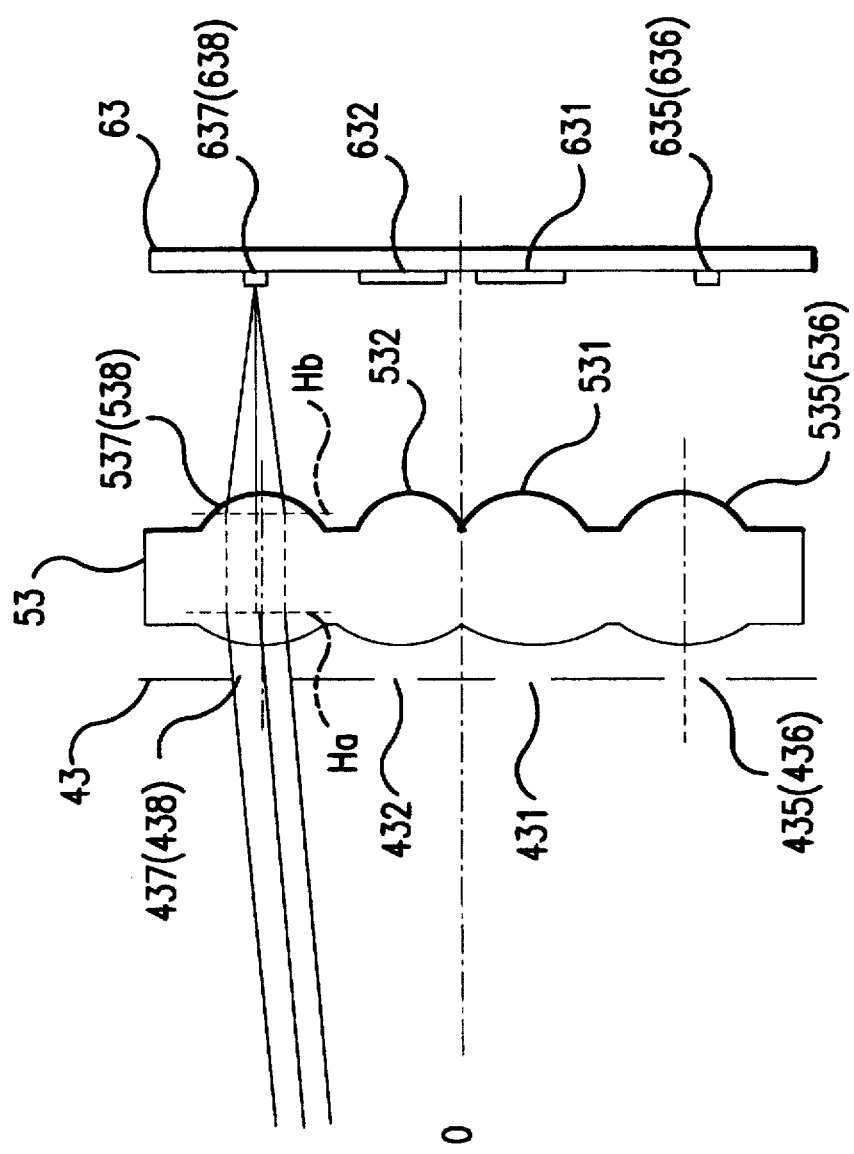
FIG. 9 is a cross-sectional drawing of a diaphragm mask, re-imaging lens and photoelectric conversion device according to another embodiment of the present invention.

Consequently, the optical axis of each lens component 531–532 and 535–538 of re-imaging lens 53 and the center of each aperture 431,432, and 435–438 of diaphragm 43 are set at substantially the same distance from optical axis O, and the exit direction of light rays from re-imaging lens 53 is deflected toward optical axis O, as shown in FIG. 9. The substrate 63 includes corresponding arrays 631–632 and 635–638. A description of the remaining configuration of the second embodiment is omitted because it is substantially similar to the abovedescribed first embodiment.

Figure 10:
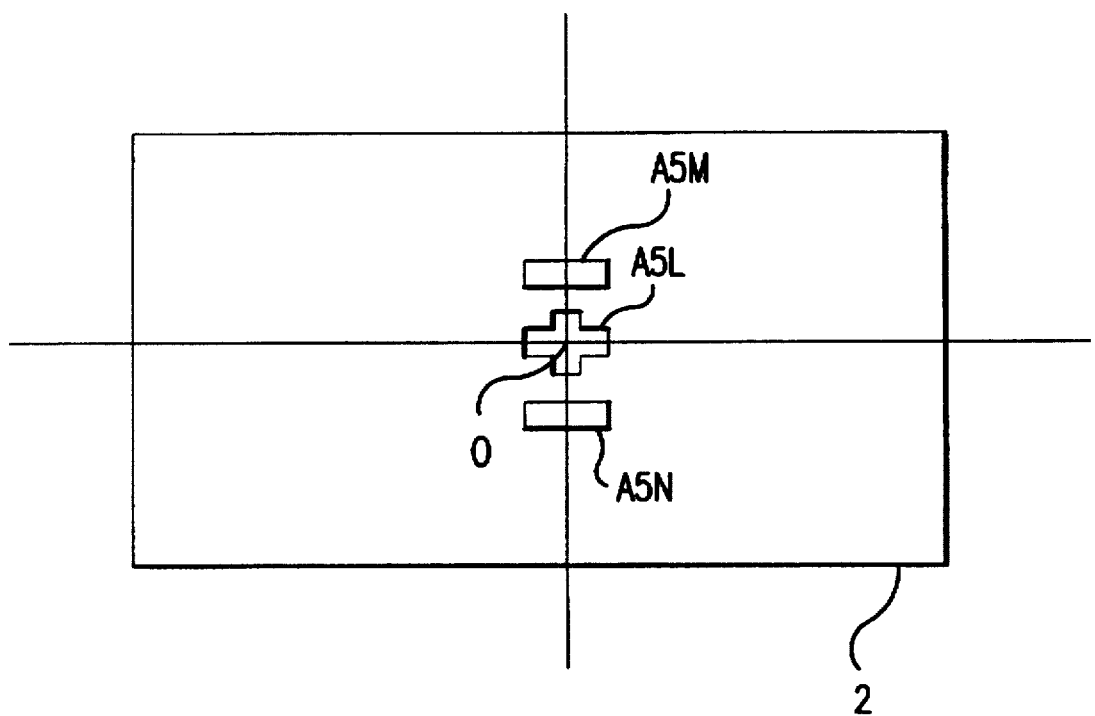
FIG. 10 is a drawing showing focus state detection areas on the photo field according to yet another embodiment, as viewed through the viewfinder optical system of the present invention.

A third embodiment of a focus state detection device will be described with reference to FIGS. 10 and 11. FIG. 10 illustrates the photo field viewed through the viewfinder optical system. On the photo field is cross-shaped focus state detection area A5L at the center of the photo field. Focus state detection areas A5M and A5N are symmetrically positioned away from the center, above and below the horizontal center of the photo field. The focus state detection areas A5M and A5N away from the center are positioned substantially perpendicular to the radial direction from the center point of the photo field. At the center of the photo field, focus state detection area A5L has both a region substantially parallel to and a region substantially perpendicular to focus state detection areas A5M and A5N.

Figure 11:
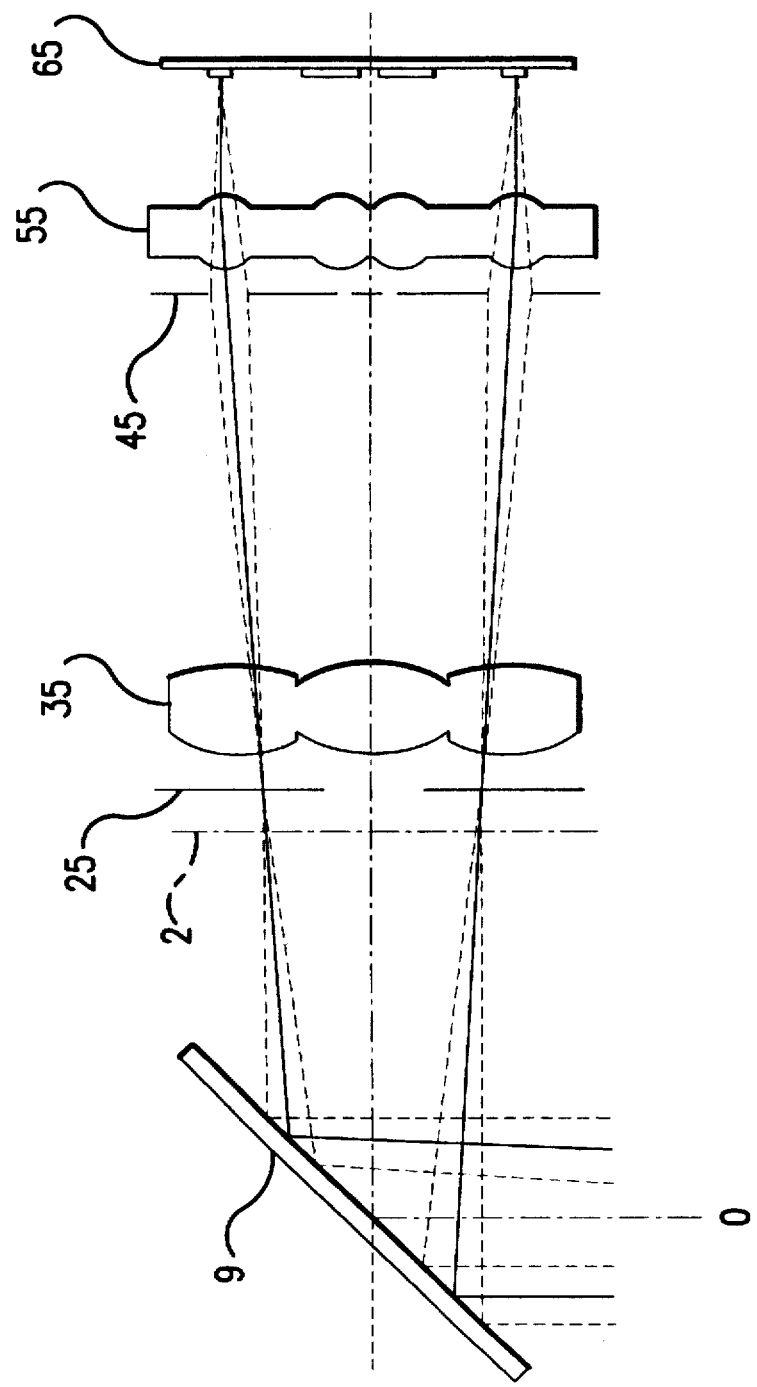
FIG. 11 is a schematic diagram of a focus state detection optical system according to yet another embodiment of the present invention.
Figure 12:
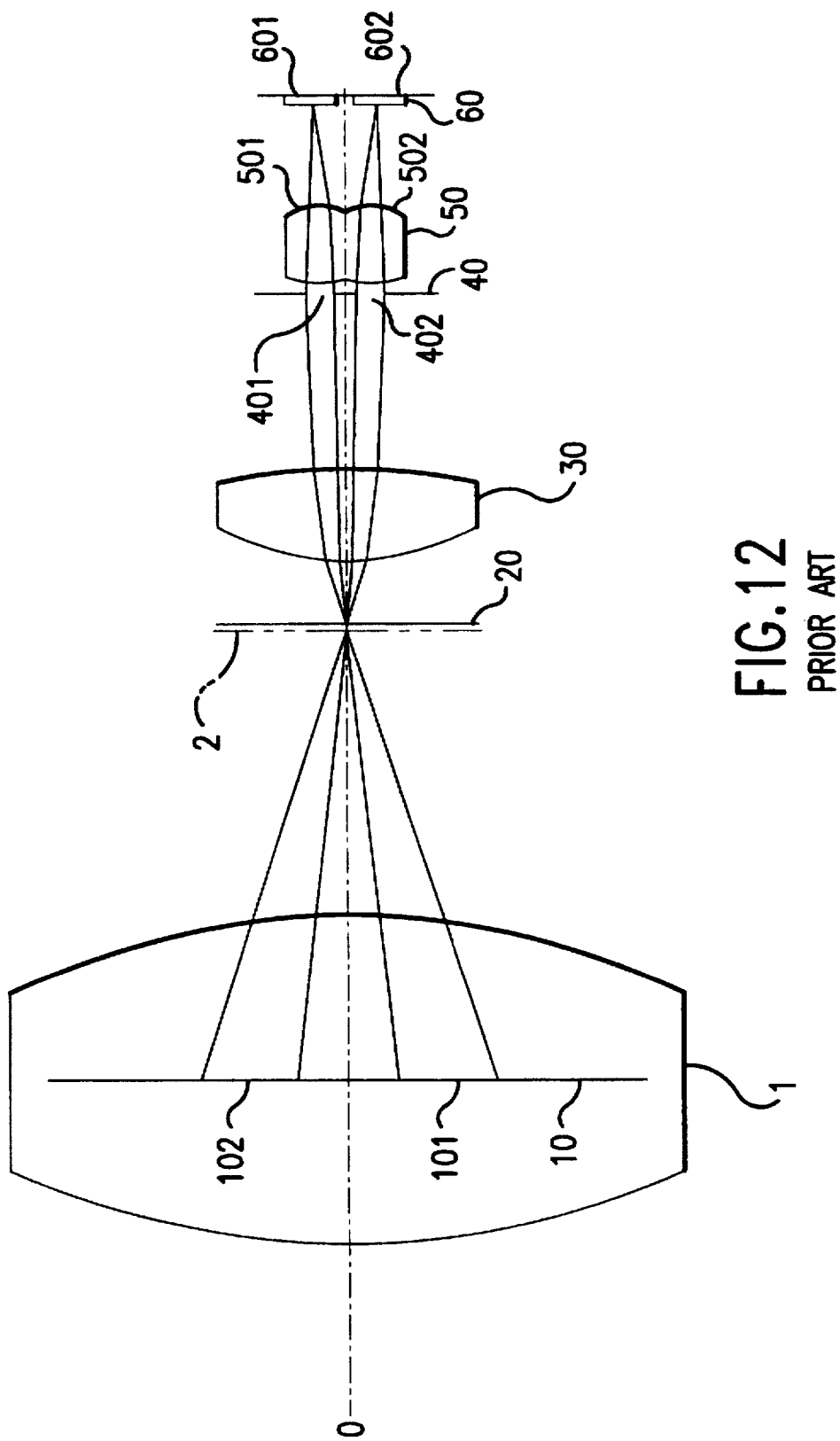
FIG. 12 is a drawing showing a conventional focus state detection device.
Figure 13:
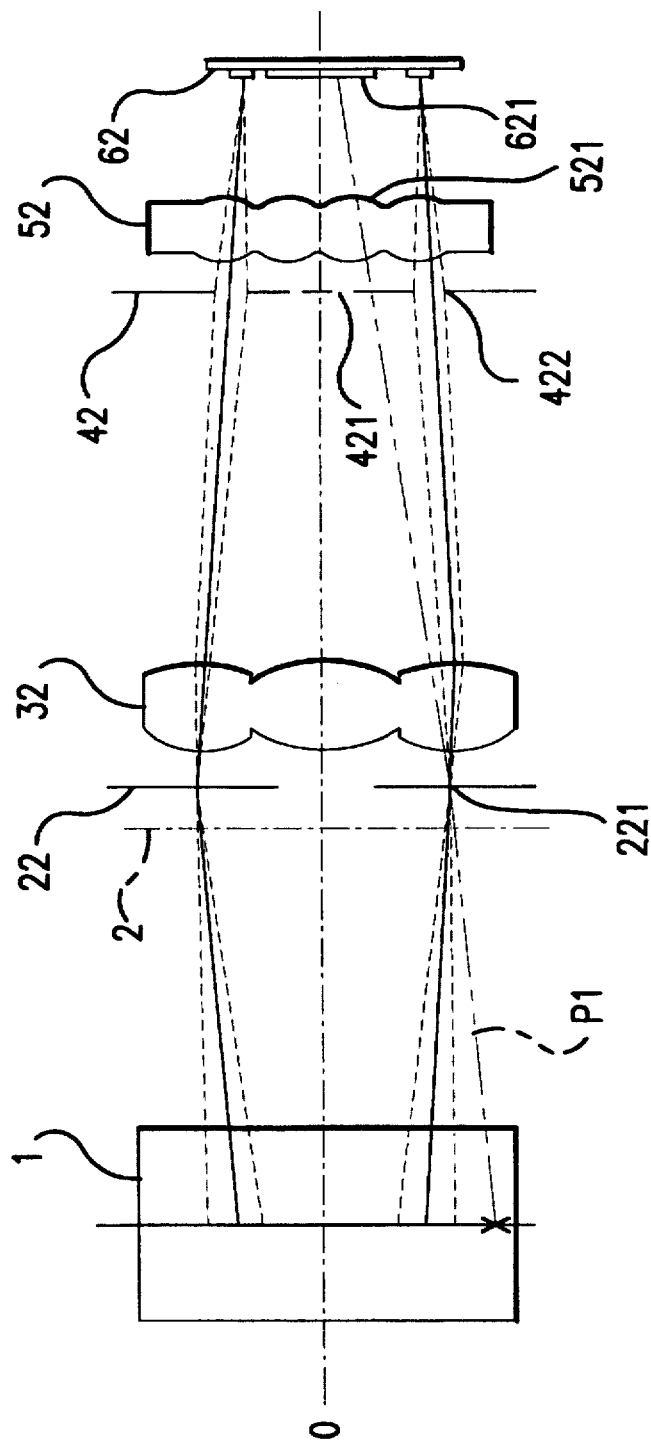
FIG. 13 is a schematic diagram of conventional focus state detection optical system.
Figure 14:
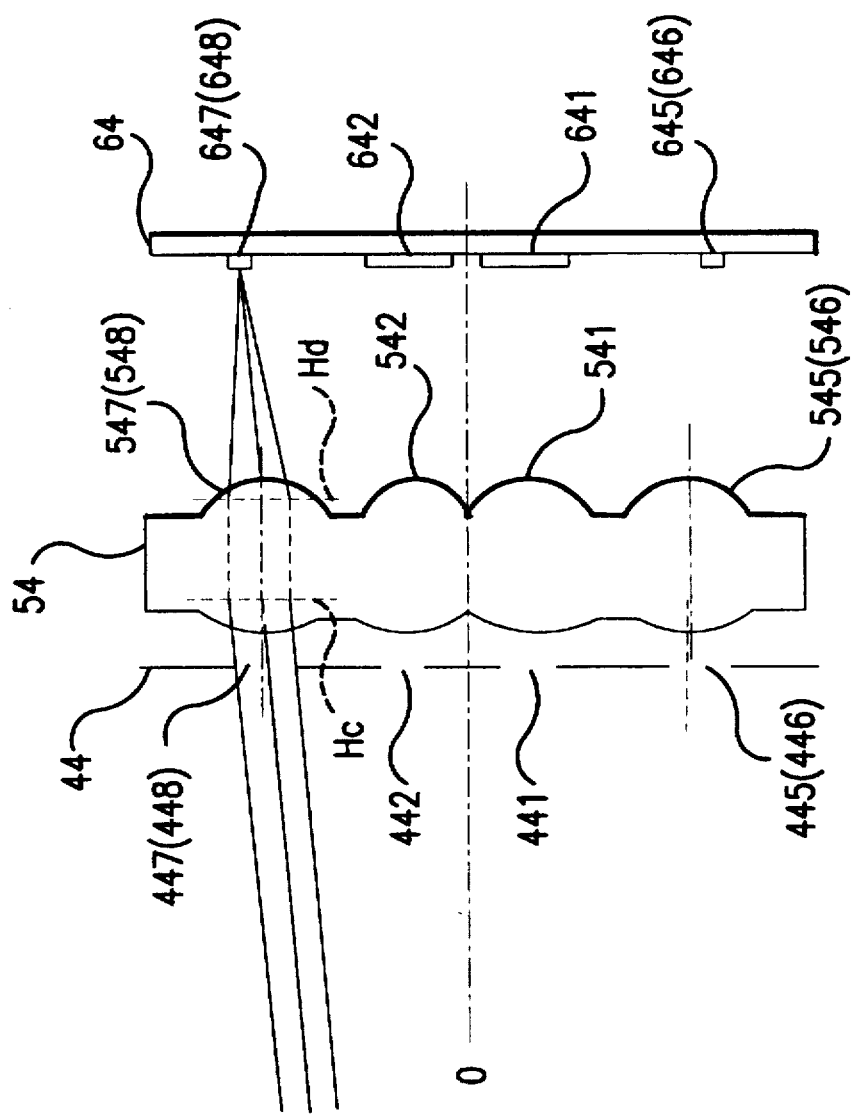
FIG. 14 is a cross-sectional drawing of a diaphragm mask, re-imaging lens and photoelectric conversion device of a conventional focus state detection optical system.

FIG. 11 is a schematic diagram of the focus state detection optical system according to the third embodiment. Auxiliary mirror 9 guides light rays for focus state detection toward the bottom of the camera body as shown in FIG. 1. In the third embodiment, focus state detection areas are provided at the center of the photo field and symmetrically above and below the center. The vertical alignment of detection regions is based on auxiliary mirror 9 and the relationship between the auxiliary mirror 9 and the parallel focus state detection optical systems as shown in FIG. 11.

A description of the remaining configuration of the third embodiment is omitted because it is substantially similar to the above-described second embodiment. As shown in FIG. 11, the remaining configuration includes a field mask 25, a condenser lens 35, a diaphragm mask 45, a bi-convex re-imaging lens 55 and a substrate 65 of a photoelectric conversion device (not shown).

In the first embodiment described above, the optical axis of each re-imaging lens in the first focus state detection optical system has a focus state detection area displaced from the center of the photo field and in a direction substantially perpendicular to the radial direction from the center point. Each re-imaging lens optical axis is decentered toward the optical axis O of the shooting lens 1 from the center of each corresponding aperture stop. Consequently, when focus state detection light rays pass through the re-imaging lens, the exit direction of the light rays deflects toward the optical axis O of the shooting lens 1. Thus, the position of the images composed on the photoelectric conversion device moves toward the optical axis O, and the substrate containing the arrays of the photoelectric conversion device can be made more compact.

In the second embodiment described above, the focus state detection light rays reaching the aperture stop from the condenser lens gradually separate farther from the optical axis of the shooting lens. However, the optical axis of each re-imaging lens and the center of each corresponding aperture stop remain substantially the same distance from the optical axis O of the shooting lens 1. Consequently, an equivalent to causing the optical axis of each re-imaging lens to become decentered toward the optical axis of the shooting lens is achieved because of the relationship between the incident light rays and the principal plane on the side of incidence Ha (see FIG. 9). Therefore, the focus state device of the second embodiment makes the substrate containing the arrays of the photoelectric conversion device smaller.

Because a light deflecting means is not positioned immediately in front of or immediately behind the condenser lens, the focus state detection device is smaller. Thus, the focus state detection device is easy to place in the limited space inside a camera body.

Further, deflecting of focus state detection light rays toward the optical axis O of the shooting lens is not caused by the shape of the condenser lens itself or the eccentricity of the optical axis, rather deflection is performed by the re-imaging lenses. Any deflection by the condenser lens is marginal. Still, in a focus state detection optical system having adjacent focus state detection areas at the center of and away from the center of the photo field, the distance between apertures stops in each pair of aperture stops does not become shorter. Accordingly, the angle of incidence must be large for a light ray from the aperture of the field mask of one focus state detection optical system to enter the aperture stop of an adjacent focus state detection optical system to reach the array of photoelectric conversion devices. According to the present invention, a light ray with such a large angle of incidence would be outside the reflecting surface of auxiliary mirror 9. Auxiliary mirror 9 guides light rays used in focus state detection to the bottom of the camera body. Consequently, a light ray with a large angle of incidence is not reflected toward the focus state detection device at the bottom of the camera body and stray light is controlled.

As many different embodiments of this invention may be made and used without departing from the spirit and scope, it is understood that the invention is not limited to the specific embodiments.

what is claimed is:

1. A focus state detection device including a shooting lens having an optical axis and a predetermined focusing plane, and a plurality of sets of focus state detection optical systems, each of said plurality of sets comprising:

a focus state detection area positioned on a photo field established at said predetermined focusing plane;

a pair of aperture stops with each aperture stop disposed about a respective central aperture axis;

a pair of bi-convex re-imaging lenses corresponding to said pair of aperture stops; and a photoelectric conversion device, wherein each of said plurality of sets forms a pair of secondary images on said photoelectric conversion device in said focus state detection area, a first focus state detection optical system of said plurality of sets of focus state detection optical systems having a first focus state detection area arranged in a direction substantially perpendicular to a radial direction from a center of said photo field, and means for deflecting a first pair of secondary images along respective secondary optical paths extending parallel with or converging toward said optical axis of said shooting lens, said deflecting means comprising a first pair of bi-convex re-imaging lenses with each re-imaging lens having a re-imaging optical axis displaced between said optical axis of said shooting lens and a respective one of the central aperture axes.

2. A focus state detection device according to claim 1, wherein a second focus state detection optical system of said plurality of sets of focus state detection optical systems disposed on said optical axis of said shooting lens comprises in the center of said photo field a second focus state detection area arranged in a direction substantially perpendicular to said first focus state detection area of said first focus state detection optical system.

3. A focus state detection device according to claim 2, wherein a third focus state detection optical system of said plurality of sets of focus state detection optical systems disposed on said optical axis of said shooting lens comprises in the center of said photo field a third focus state detection area arranged in a direction substantially parallel to said first focus state detection area of said first focus state detection optical system.

4. A focus state detection device including a shooting lens having an optical axis and a predetermined focusing plane, and a plurality of sets of focus state detection optical systems, each of said plurality of sets comprising:

a focus state detection area positioned on a photo field established at said predetermined focusing plane;

a pair of aperture stops with each aperture stop disposed about a respective central aperture axis;

a pair of bi-convex re-imaging lenses corresponding to said pair of aperture stops; and a photoelectric conversion device, wherein each of said plurality of sets forms a pair of secondary images on said photoelectric conversion device in said focus state detection area, a first focus state detection optical system of said plurality of sets of focus state detection optical systems having a first focus state detection area arranged in a direction substantially perpendicular to a radial direction from a center of said photo field, and means for deflecting a first pair of secondary images along respective secondary optical paths extending parallel with or converging toward said optical axis of said shooting lens, said deflecting means comprising a first pair of aperture stops being positioned so that light rays passing through said first pair of aperture stops become gradually farther away from said optical axis between said first pair of aperture stops and said first pair of bi-convex re-imaging lenses, wherein a re-imaging optical axis of each of said first pair of bi-convex re-imaging lenses and respective ones of the central aperture axes of said first pair of aperture stops are substantially equidistant from said optical axis of said shooting lens.

5. A focus state detection device according to claim 4, wherein a second focus state detection optical system of said plurality of sets of focus state detection optical systems disposed on said optical axis of said shooting lens comprises in the center of said photo field a second focus state detection area arranged in a direction substantially perpendicular to said first focus state detection area of said first focus state detection optical system.

6. A focus state detection device according to claim 5, wherein a third focus state detection optical system of said plurality of sets of focus state detection optical systems disposed on said optical axis of said shooting lens comprises in the center of said photo field a third focus state detection area arranged in a direction substantially parallel to said first focus state detection area of said first focus state detection optical system.

7. A focus state detection device including a shooting lens having an optical axis and a predicted focussing plane, and a plurality of sets of focus state detection optical systems positioned behind said predicted focussing plane of said shooting lens, each set comprising:

a focus state detection area established on a photo field of said shooting lens;

a condenser lens positioned near said predicted focussing plane of said shooting lens;

an aperture area having a pair of aperture stops with each aperture stop disposed about a respective central aperture axis and positioned behind said condenser lens to restrict light rays used in focus state detection that pass through the shooting lens, being a center of each of said pair of aperture stops aligned in the same direction as said focus state detection area;

a re-imaging optical device having a pair of bi-convex re-imaging lenses with each re-imaging lens having a re-imaging optical axis and positioned immediately behind said aperture area, said re-imaging optical device re-composing an image of said shooting lens into a pair of secondary images using light rays passing through said corresponding pair of aperture stops such that respective ones of the re-imaging optical axes of said pair of bi-convex re-imaging lenses are aligned in the same direction as said focus state detection area; and focus adjustment means for detecting and adjusting a focus condition of said shooting lens, wherein said focus adjustment means comprises a pair of photoelectric sensor arrays that receive said pair of secondary images so that said focus condition can be detected from a relative positional relationship of said pair of secondary images, a first focus state detection optical system of said plurality of sets of focus state detection optical systems comprising:

a focus detection area positioned away from a center of said photo field and in a direction substantially perpendicular to a radial direction from said optical axis of said shooting lens; and means for deflecting said pair of secondary images along respective optical paths extending parallel with or converging toward said optical axis of said shooting lens, wherein said deflecting means comprises a corresponding pair of bi-convex re-imaging lenses with each re-imaging lens having a re-imaging optical axis being displaced between said optical axis of said shooting lens and a respective one of the central aperture axes of the corresponding pair of aperture stops.

8. A focus state detection device according to claim 7, wherein a first central focus state detection optical system of said plurality of sets of focus state detection optical systems comprises in said center of said photo field a focus state detection area arranged in a direction substantially perpendicular to said focus state detection area of said first focus state detection optical system.

9. A focus state detection device according to claim 8, wherein a second central focus state detection optical system of said plurality of sets of focus state detection optical systems comprises in said center of said photo field a focus state detection area arranged in a direction substantially parallel to said focus state detection area of said first focus state detection optical system.

10. A focus state detection device according to claim 9, further comprising a second focus state detection optical system of said plurality of sets of focus state detection optical systems having said deflecting means, wherein focus state detection areas of said first and said second sets of focus state detection optical systems are located symmetrically side by side to the center of said photo field of said shooting lens.

11. A focus state detection device according to claim 9, further comprising a second focus state detection optical system of said plurality of sets of focus state detection optical systems having said deflecting means, wherein focus state detection areas of said first and said second sets of focus state detection optical systems are located symmetrically above and below the center of said photo field of said shooting lens.

12. A focus state detection device according to claim 7, further comprising an auxiliary mirror, wherein each pair of said aperture stops corresponding to adjacent focus state detection optical systems are separated by a predetermined distance, wherein said predetermined distance is selected such that a subject image light with an angle of incidence is prevented from reaching the photoelectric conversion device of an adjacent focus state detection optical system by a position of said auxiliary mirror.

13. A focus state detection device according to claim 7, wherein said each of said plurality of sets further comprises a field mask having at least one field aperture corresponding to said focus detection area, said field mask being positioned immediately in front of said condenser lens.

14. A focus state detection device including a shooting lens having an optical axis and a predicted focussing plane, and a plurality of sets of focus state detection optical systems positioned behind said predicted focussing plane of said shooting lens, each set comprising:

a focus state detection area established on a photo field of said shooting lens;

a condenser lens positioned near said predicted focussing plane of said shooting lens;

an aperture area having a pair of aperture stops with each aperture stop disposed about a respective central aperture axis and positioned behind said condenser lens to restrict light rays used in focus state detection that pass through the shooting lens, being a center of each of said pair of aperture stops aligned in the same direction as said focus state detection area;

a re-imaging optical device having a pair of bi-convex re-imaging lenses with each re-imaging lens having a re-imaging optical axis and positioned immediately behind said aperture area, said re-imaging optical device re-composing an image of said shooting lens into a pair of secondary images using light rays passing through said corresponding pair of aperture stops such that respective ones of the re-imaging optical axes of said pair of bi-convex re-imaging lenses are aligned in the same direction as said focus state detection area; and focus adjustment means for detecting and adjusting a focus condition of said shooting lens, wherein said focus adjustment means comprises a photoelectric conversion device having a pair of photoelectric sensor arrays that receive said pair of secondary images so that said focus condition can be detected from relative positional relationship of said pair of secondary images, a first focus state detection optical system of said plurality of sets of focus state detection optical systems comprising:

a focus detection area positioned away from a center of said photo field and in a direction substantially perpendicular to a radial direction from said optical axis of said shooting lens; and means for deflecting said pair of secondary images along respective optical paths extending parallel with or converging toward said optical axis of said shooting lens, wherein said deflecting means comprises said pair of aperture stops being positioned so that light rays passing through said condenser lens and incident on each of said pair of aperture stops become gradually farther away from said shooting lens optical axis between said condenser lens and said first pair of aperture stops, wherein said re-imaging optical axis of each said bi-convex re-imaging lenses and respective ones of the central aperture axes of said corresponding aperture stops are a substantially equidistant from said optical axis of said shooting lens.

15. A focus state detection device according to claim 14, wherein a first central focus state detection optical system of said plurality of sets of focus state detection optical systems comprises in said center of said photo field a focus state detection area arranged in a direction substantially perpendicular to said focus state detection area of said first focus state detection optical system.

16. A focus state detection device according to claim 15, wherein a second central focus state detection optical system of said plurality of sets of focus state detection optical systems comprises in said center of said photo field a focus state detection area arranged in a direction substantially parallel to said focus state detection area of said first focus state detection optical system.

17. A focus state detection device according to claim 16, further comprising a second focus state detection optical system of said plurality of sets of focus state detection optical systems having said deflecting means, wherein focus state detection areas of said first and said second sets of focus state detection optical systems are located symmetrically side by side to the center of said photo field of said shooting lens.

18. A focus state detection device according to claim 16, wherein said each of said plurality of sets further comprises a field mask having at least one field aperture corresponding to said focus detection area, said field mask being positioned immediately in front of said condenser lens.

19. A focus state detection device according to claim 14, further comprising a second focus state detection optical system of said plurality of sets of focus state detection optical systems having said deflecting means, wherein focus state detection areas of said first and said second sets of focus state detection optical systems are located symmetrically above and below the center of said photo field of said shooting lens.

20. A focus state detection device according to claim 14, further comprising an auxiliary mirror, wherein each pair of said aperture stops corresponding to adjacent focus state detection optical systems are separated by a predetermined distance, wherein said predetermined distance is selected such that a subject image light with an angle of incidence is prevented from reaching the photoelectric conversion device of an adjacent focus state detection optical system by a position of said auxiliary mirror.

21. A method of focus state detection comprising:

transmitting light from a subject through a shooting lens having an optical axis and a predicted focussing plane;

condensing a subject image using condensing means positioned near a predicted focussing plane of said shooting lens;

detecting a focus condition of the subject using focus state detection means;

establishing at least one focus state detection area corresponding to said focus state detection means positioned away from a center of a photo field established at said predicted focussing plane and arranged in a direction substantially perpendicular to a radial direction from said center of said photo field;

forming pairs of secondary images of the subject corresponding to said at least one focus state detection area; and deflecting said pairs of secondary images of the subject onto a photoelectric conversion device, wherein said deflecting step comprises:

limiting allowed light using an aperture means having a pair of aperture stops with each aperture stop disposed about a respective central aperture axis;

re-composing the subject image into said pair of secondary images using bi-convex re-imaging means having a pair of bi-convex re-imagine lenses corresponding to the pair of aperture stops with each re-imaging lens having a re-imaging optical axis; and deflecting said pair of secondary images along respective optical paths extending parallel with or converging toward said shooting lens optical axis.

22. The method according to claim 21, further comprising the step of detecting and adjusting a focus condition of said shooting lens, wherein said focus condition is detected and adjusted based on relative positions of said pairs of secondary images.

23. The method according to claim 22, further comprising:

locating adjacent aperture means separated by a predetermined distance;

deflecting said light from said subject using an auxiliary mirror; and placing said adjacent aperture means at said predetermined distance apart so that an angle of incidence for said subject light from said aperture means of said focus state detection means enters said aperture means of adjacent focus state detection means, wherein said subject light having said angle of incidence is outside a reflecting surface of said auxiliary mirror.

24. The method according to claim 21, further comprising the step of locating a first central focus state detection optical system having a focus state detection means forming in said center of said photo field a focus state detection area disposed in a direction substantially perpendicular to said at least one focus state detection area.

25. The method according to claim 24, further comprising the step of locating a second central focus state detection optical system having in said center of said photo field a focus state detection area arranged in a direction substantially parallel to said at least one focus state detection area.

26. A method of focus state detection comprising:

transmitting light from a subject through a shooting lens having an optical axis and a predicted focussing plane;

condensing a subject image using condensing means positioned near a predicted focussing plane of said shooting lens;

detecting a focus condition of the subject using focus state detection means;

establishing at least one focus state detection area corresponding to said focus state detection means positioned away from a center of a photo field established at said predicted focussing plane and arranged in a direction substantially perpendicular to a radial direction from said center of said photo field;

forming pairs of secondary images of the subject corresponding to said at least one focus state detection area; and deflecting said pairs of secondary images of the subject along respective optical paths extending parallel with or converging toward said shooting lens optical axis, wherein said deflecting step comprises:

limiting allowed light using aperture means having a pair of aperture stops with each aperture stop disposed about a respective central aperture axis so that the subject image light rays passing through said aperture means become gradually farther away from said shooting lens optical axis between said condensing means and said aperture means; and re-composing the subject image into said pair of images using bi-convex re-imaging means having a pair of bi-convex re-imagine lenses corresponding to the pair of aperture stops with each re-imaging lens having a re-imaging optical axis, wherein respective ones of the central aperture axes and the re-imaging optical axes are substantially equidistant from said optical axis of said shooting lens.

27. The method according to claim 26, further comprising the step of detecting and adjusting a focus condition of said shooting lens, wherein said focus condition is detected and adjusted based on relative positions of said pairs of secondary images.

28. The method according to claim 26, further comprising the step of locating a first central focus state detection optical system having in said center of said photo field a focus state detection area disposed in a direction substantially perpendicular to said at least one focus state detection area.

29. The method according to claim 28, further comprising the step of locating a second central focus state detection optical system having in said center of said photo field a focus state detection area arranged in a direction substantially parallel to said at least one focus state detection area.

30. A method of focus state detection comprising:

transmitting light from a subject through a shooting lens having an optical axis and a predicted focussing plane;

condensing a subject image using condensing means positioned near a predicted focussing plane of said shooting lens;

detecting a focus condition of the subject using focus state detection means;

establishing at least one focus state detection area corresponding to said focus state detection means positioned away from a center of a photo field established at said predicted focussing plane and arranged in a direction substantially perpendicular to a radial direction from said center of said photo field;

forming pairs of secondary images of the subject corresponding to said at least one focus state detection area; and deflecting said pairs of secondary images of the subject along respective optical paths extending parallel with or converging toward said shooting lens optical axis, wherein said deflecting step comprises:

deflecting the subject image using auxiliary mirror means; and limiting allowed light using aperture means having a pair of aperture stops with each aperture stop disposed about a respective central aperture axis;

recomposing the subject image into said pair of secondary images using bi-convex re-imaging means having a pair of bi-convex re-imaging lenses corresponding to the pair of aperture stops with each re-imaging lens having a re-imaging optical axis;

deflecting said pair of secondary images onto the photo-electric conversion device at a position at least coincident with the respective central aperture axes or away from the respective central aperture axes toward said shooting lens optical axis ; and locating at least two focus state detection areas on said photo field and with an alignment symmetrically above and below said photo field, wherein said alignment of said at least two focus state detection areas is based on a position of said auxiliary mirror means.

\* \* \* \* \*